United States Patent
Fröhlich et al.

(10) Patent No.: US 11,127,304 B2
(45) Date of Patent: Sep. 21, 2021

(54) METHOD, DEVICE, AND COMPUTER-READABLE STORAGE MEDIUM WITH INSTRUCTIONS FOR ESTIMATING THE POSE OF A TRANSPORTATION VEHICLE

(71) Applicant: VOLKSWAGEN AKTIENGESELLSCHAFT, Wolfsburg (DE)

(72) Inventors: Lukas Fröhlich, Cologne (DE); Christian Merfels, Braunschweig (DE); Bernd Rech, Bokensdorf (DE); Thilo Schaper, Lehrte (DE); Niklas Koch, Wolfsburg (DE); Daniel Wilbers, Wolfsburg (DE); Frederik Meysel, Braunschweig (DE)

(73) Assignee: VOLKSWAGEN AKTIENGESELLSCHAFT

( * ) Notice: Subject to any disclaimer, the term of this patent is extended or adjusted under 35 U.S.C. 154(b) by 0 days.

(21) Appl. No.: 16/604,693

(22) PCT Filed: Apr. 9, 2018

(86) PCT No.: PCT/EP2018/058998
§ 371 (c)(1),
(2) Date: Oct. 11, 2019

(87) PCT Pub. No.: WO2018/189089
PCT Pub. Date: Oct. 18, 2018

(65) Prior Publication Data
US 2020/0126429 A1   Apr. 23, 2020

(30) Foreign Application Priority Data
Apr. 13, 2017   (DE) .................. 10 2017 108 107.0

(51) Int. Cl.
*G08G 1/00*   (2006.01)
*G01S 19/42*   (2010.01)
(Continued)

(52) U.S. Cl.
CPC ............ *G08G 1/202* (2013.01); *G01S 19/393* (2019.08); *G01S 19/42* (2013.01); *G01S 19/53* (2013.01)

(58) Field of Classification Search
CPC ....... G08G 1/202; G01S 19/393; G01S 19/42; G01S 19/53; G01S 19/39; G01C 21/005
(Continued)

(56) References Cited

U.S. PATENT DOCUMENTS 7,991,550 B2    8/2011   Zeng
9,031,782 B1 *  5/2015   Lemay ................ G01S 19/48
                                                  701/445
(Continued)

FOREIGN PATENT DOCUMENTS

DE   102011005584 A1   9/2012
DE   102013208521 A1   11/2014
(Continued)

OTHER PUBLICATIONS

Search Report for International Patent Application No. PCT/EP2018/058998; dated Jul. 16, 2018.
(Continued)

*Primary Examiner* — Daryl C Pope
(74) *Attorney, Agent, or Firm* — Barnes & Thornburg LLP (57) ABSTRACT

A method, a device, and a computer-readable storage medium with instructions for determining the location of a datum detected by a transportation vehicle wherein at least one pose estimation is ascertained. An uncertainty of the at least one pose estimation is determined wherein the uncer-
(Continued)

tainty of the pose estimation includes a process of scaling an uncertainty estimation of the pose estimation, wherein the scaling process is based on a comparison of the pose estimation with a priori information. The at least one pose estimation is fused solely with at least one additional pose estimation with a weighting according to the uncertainties.

12 Claims, 4 Drawing Sheets

(51) Int. Cl.
 *G01S 19/53* (2010.01)
 *G01S 19/39* (2010.01)

(58) Field of Classification Search
 USPC ...... 340/901–905, 932.2, 937, 933, 435–436
 See application file for complete search history.

(56) References Cited

U.S. PATENT DOCUMENTS

| | | | |
|---|---|---|---|
| 10,371,530 B2* | 8/2019 | Ramanandan | G01S 19/49 |
| 2014/0316698 A1* | 10/2014 | Roumeliotis | G06T 7/70 |
| | | | 701/500 |
| 2014/0341465 A1* | 11/2014 | Li | G06K 9/4671 |
| | | | 382/160 |
| 2016/0231432 A1 | 8/2016 | Simon et al. | |
| 2017/0038477 A1 | 2/2017 | Schmid | |
| 2020/0226931 A1* | 7/2020 | Caldwell | G08G 1/0112 |

FOREIGN PATENT DOCUMENTS

| | | |
|---|---|---|
| DE | 102014211178 A1 | 6/2015 |
| DE | 102015004676 A1 | 12/2015 |
| DE | 102015218808 A1 | 3/2017 |
| DE | 102016011366 A1 | 4/2017 |
| EP | 3566021 A1 | 11/2019 |
| WO | 2008069998 A2 | 6/2008 |
| WO | 2013166096 A1 | 11/2013 |
| WO | 2015189183 A1 | 12/2015 |
| WO | 2015189204 A1 | 12/2015 |

OTHER PUBLICATIONS

International Preliminary Report on Patentability for International Patent Application No. PCT/EP2018/058998; dated Oct. 15, 2019.

* cited by examiner

METHOD, DEVICE, AND COMPUTER-READABLE STORAGE MEDIUM WITH INSTRUCTIONS FOR ESTIMATING THE POSE OF A TRANSPORTATION VEHICLE

PRIORITY CLAIM

This patent application is a U.S. National Phase of International Patent Application No. PCT/EP2018/058998, filed 9 Apr. 2018, which claims priority to German Patent Application No. 10 2017 108 107.0, filed 13 Apr. 2017, the disclosures of which are incorporated herein by reference in their entireties.

SUMMARY

Illustrative embodiments relate to a method, to a device, and to a computer-readable storage medium with instructions for estimating a pose of a transportation vehicle, in particular, for estimating a pose of a transportation vehicle by a fusing method. Illustrative embodiments also relate to a transportation vehicle in which a disclosed method or a disclosed device is used.

BRIEF DESCRIPTION OF THE DRAWINGS

Disclosed embodiments will be explained in more detail in the following description and the appended claims in conjunction with the figures, in which:

DETAILED DESCRIPTION

The pose of a transportation vehicle is made up of its position and orientation. Location fusing processes take a set of pose estimations and their estimated uncertainty levels, fuse them and output a single pose estimation together with an uncertainty estimation. Examples of such fusing methods are, e.g., filter-based algorithms such as the Kalman filter, the extended Kalman filter, the information filter, the unscented Kalman filter or the particle filter, or compensation approaches such as in DE 10 2015 219 577.

WO 2015/189183 A1 describes a method for correcting output data of a basic sensor system, wherein the basic sensor system and at least one further sensor system acquire input data and output the data as output data. Error values of the output data of the basic sensor system are determined by the output data of the at least one further sensor system. The error values are corrected by applying corrections. The determination of the error values comprises determining an error value of an incline of a characteristic curve of the basic sensor system, wherein the characteristic curve describes a dependence of the output data of the basic sensor system on the input data of the basic sensor system. The output data can be fused to form a fusion dataset.

WO 2015/189204 A1 describes a method for the improved detection or compensation of error values, measured values, physical variables describe, are acquired by a sensor system. The measured values are subject to error values which describe deviations of the measured values from the described physical variables. The error values are detected or compensated by a comparison. In this context, measured values which exceed a limiting value are not used to detect or to compensate error values of other measured values. The measured values can be fused to form a fusion dataset.

WO 2013/166096 A1 describes an approach for the distributed positioning and collaborative acquisition of the behavior within a group of objects. Interactive markings, which are assigned to each of a multiplicity of objects, supply relative position data and state information relating to other objects located in the vicinity to each marking. With this information, each object develops a spatial awareness of its surroundings, including the position and the behavior of objects located in the vicinity, when necessary to modify its behavior, to achieve an objective more effectively. The described approach integrates localized relational position data with fused sensor data which are related to the spatial positioning.

U.S. Pat. No. 7,991,550 B2 describes a method for simultaneously tracking a multiplicity of objects and for recording a multiplicity of object location-determination sensors, which are mounted on a transportation vehicle, relative to the transportation vehicle. The method is based on collected sensor data, historical sensor recording data, historical object trajectories and a weighted algorithm based on the geometric vicinity in relation to the transportation vehicle and variance of the sensor data. To determine trajectories of the objects, sensor data are fused.

DE 10 2013 208 521 A1 describes a method for collectively learning and producing a digital road model describe. In this context, trajectory data and perception data are acquired from a multiplicity of transportation vehicles. Associations are produced between the trajectories by forming feature grids and probability field feature grids for corresponding trajectory points which are to be associated, and these grids are correlated to form association hypotheses. An information graph is formed on the basis of the associations as well as on the basis of odometry data acquisition processes and position acquisition processes, and the associated optimization problem is solved to estimate optimum trajectory points. The acquired perception data are evaluated on the basis of the estimated trajectory points, aggregated and fused to produce a high-precision road model.

DE 10 2014 211 178 A1 describes a method for correcting measurement data of a first sensor system, wherein the first sensor system or a second sensor system and a basic sensor system are closely coupled. The first sensor system, the second sensor system and the basic sensor system each acquire different measurement data. The measurement data each describe navigation data, directly or indirectly. The indirectly described navigation data are calculated from the measurement data or from known physical or mathematical associations.

The measurement data of the first sensor system have first error values, wherein the first error values observable when a sufficient number of measurement data of the second sensor system or measurement data of the basic sensor system are present. The first error values are corrected when they can be observed and assumed as constant when they cannot be observed. The navigation data can be fused to form a fusion dataset.

US 2016/0231432 A1 describes a method for acquiring a current position of a transportation vehicle in a geodetic coordinate system from a time sequence of first geodetic position data items which are recorded, in particular, by a position sensor which is assigned to a global navigation satellite system, and intrinsic movement data recorded by at least one intrinsic movement sensor. The position is acquired by applying a transformation into the geodetic coordinate system onto a displacement vector, derived from the most current, from the intrinsic movement data, of the transportation vehicle, starting from a reference time to which the transformation relates. In this context, the transformation is determined within the scope of a regression analysis as optimum mapping of a profile, acquired over a defined time period, of displacement vectors onto a profile of the position data acquired for the same time period. Fusion of the sensor data is implemented by the regression analysis.

US 2017/0038477 A1 describes a method for correcting a position of a transportation vehicle with a global satellite navigation system GNSS for determining the intrinsic position. Firstly, a first position of the transportation vehicle is acquired by the GNSS. A second position of the transportation vehicle is acquired by fitting the first position into a road of a digital map. At least one object in the surroundings of the transportation vehicle is then identified, the position of which object can be referenced on the digital map. A real distance between the transportation vehicle and the respective object is acquired by a sensor of the transportation vehicle. Finally, a calculated distance between the second position and the respective object is calculated, wherein a corrected position of the transportation vehicle is acquired by minimizing the deviation of the calculated distance from the real distance. The first position can be acquired by a sensor fusion unit for combining and checking the plausibility of the sensor data.

The known solutions involve the problem that inaccurate or improbable and implausible pose estimations are processed just the same as accurate pose estimations.

The exemplary embodiments disclose solutions for estimating a pose of a transportation vehicle which achieve an improved estimation result.

This is achieved by the disclosed method, by the disclosed computer-readable storage medium with instructions, and by the disclosed device.

According to a first disclosed embodiment, a method for estimating a pose of a transportation vehicle comprises:
  acquiring at least one pose estimation; and
  determining an uncertainty level of the at least one pose estimation, wherein the determination of the uncertainty level of the pose estimation comprises a process of scaling an uncertainty estimation of the pose estimation on the basis of a comparison of the pose estimation with a priori information.

According to a further disclosed embodiment, a computer-readable storage medium contains instructions which, when executed by a computer, cause the computer to execute the following operations for estimating a pose of a transportation vehicle:
  acquiring at least one pose estimation; and
  determining an uncertainty level of the at least one pose estimation, wherein the determination of the uncertainty level of the pose estimation comprises a process of scaling an uncertainty estimation of the pose estimation on the basis of a comparison of the pose estimation with a priori information.

The term computer is to be understood broadly here. It also includes control devices and other processor-based data processing devices.

According to a further disclosed embodiment, a device for estimating a pose of a transportation vehicle has a data acquisition unit for acquiring at least one pose estimation, and an evaluation unit for determining an uncertainty level of the at least one pose estimation, wherein the evaluation unit is configured to carry out, when the uncertainty level of the pose estimation is being determined, a process of scaling an uncertainty estimation of the pose estimation on the basis of a comparison of the pose estimation with a priori information.

The at least one pose estimation may be fused with at least one further pose estimation with a weighting corresponding to the uncertainty levels. For this purpose, the device can have a fusing unit for fusing the at least one pose estimation with at least one further pose estimation with a weighting corresponding to the uncertainty levels.

According to the disclosed embodiments, the estimation result is improved in that the pose estimations with relatively low accuracy also make a smaller contribution to the overall result. This is achieved in that the individual input poses are compared on the basis of a priori information and their plausibility is tested. A pose estimation which is subject to an uncertainty level and which is categorized as implausible on the basis of the additional information receives an even higher uncertainty level. As result, it is taken into account less, for example, in the fusion method. This approach essentially provides the possibility of scaling the uncertainty level of a pose estimation on the basis of a priori information. This has a positive effect, in particular, in sensor data fusion operations, since through the scaling their true certainty level is represented better and outlier measurements can be treated better. However, the acquisition of a single pose estimation is also sufficient to be able to apply the method. If, for example, just one measurement of a single GPS receiver (Global Positioning System) is to be processed without fusing it with another source, an accurate uncertainty estimation of this one pose source can be obtained with the described solution. In addition, the method can also be applied to a single pose estimation, which is then fused with pose estimations to which the method has not been applied.

The method presented here can be applied for all of the fusion methods mentioned in the introduction. This is due to the fact that in the fusion the uncertainty estimations of the input pose estimations are used to weight the individual information items with respect to one another. For this weighting, the individual pose estimation is given more weighting the lower its uncertainty level. Expressed in formal terms this means that the weighting term $\Omega_i$ is given as the inverse of the covariance matrix: $\Omega_i = \Sigma_i^{-1}$. Therefore, the correct uncertainty estimation of the input pose estimations is highly significant.

Ideally, an associated covariance matrix $\Sigma_i$ is therefore present for each input pose estimation and indicates the estimation uncertainty level. In reality, these uncertainty estimations are of fluctuating quality. There are therefore systems which supply just one constant covariance matrix, that is to say incorrectly estimate all the pose estimations as of equal quality, according to $$\Sigma_i \Sigma \ \forall i. \tag{1}$$

This may be the case, e.g., if the uncertainty estimation cannot be performed analytically but rather a sample variance could be determined only on the basis of the comparison of the pose estimation data with respect to a reference.

An example of this is position estimations of a GPS receiver. In normal operation, the estimated uncertainty level can lie within a few meters and therefore map the normal operation well. However, if multi-path effects (multipath propagation) occurs, the position estimation can be inaccurate by dozens of meters. If the algorithm which determines the position estimation from the GPS receiver data does not take this into account, the estimated uncertainty is much too small for the actual error.

Such procedures are in the best case an approximation of the uncertainty levels of the pose estimations, but in the worst case are simply inaccurate. The pose estimations can contain errors which are significantly greater than what is expressed by the associated covariance matrix.

According to at least one disclosed embodiment, the a priori information is a comparison trajectory. Such a priori information can be relatively easily acquired. The solution described here presents a possible way of scaling uncertainty estimations of pose estimations if additional knowledge is available as a comparison trajectory. The solution is based on a plausibility check of estimated input poses on the basis of this comparison trajectory. The underlying method can be carried out quickly and online since only a distance of the pose estimation has to be determined for the comparison trajectory. The comparison trajectory can originate from various sources. For example, the geometric center line of a road can be adopted. For autonomous transportation vehicles it is alternatively possible to use the calculated reference trajectory of the path planning process as a comparison trajectory. The trajectories of transportation vehicles traveling ahead, so-called scouting transportation vehicles, can also serve as comparison trajectory.

According to at least one disclosed embodiment, the comparison trajectory is acquired from a detailed map. By transferring the geometric center line of a road from a detailed map it is easily possible to make available a comparison trajectory.

According to at least one disclosed embodiment, the uncertainty estimation is scaled to a greater extent the greater the distance between the associated pose estimation and the comparison trajectory. Pose estimations with a large distance from the comparison trajectory are per se less probable, which is expressed by a higher uncertainty estimation. The scaling of the uncertainty estimation in accordance with the distance from the comparison trajectory makes it easily possible to determine a more accurate uncertainty level.

According to at least one disclosed embodiment, a distance of the transportation vehicle from the comparison trajectory is acquired with a camera system. With a camera system it is possible to capture traffic lane boundaries to the left and right of the transportation vehicle and thereby calculate the distance of the transportation vehicle from the comparison trajectory. This additional information helps to detect situations in which the transportation vehicle is not located near to the comparison trajectory, for example, the center of the lane. Therefore, the distance of the pose estimation from the comparison trajectory can be replaced by the distance from the comparison trajectory plus the distance which the camera system has calculated relative to the comparison trajectory.

According to at least one disclosed embodiment, the scaling process is based on a symmetrical scaling function or a scaling function which is adapted to the surroundings of a transportation vehicle. As a rule, the direction of the deviation from the comparison trajectory should not influence the magnitude of the scaling, which is expressed by a symmetrical scaling function. However, for reasons related to the situation it is also possible for an asymmetrical scaling function to be appropriate, for example, if deviations from the comparison trajectory in a specific direction are very improbable or even impossible owing to structural conditions.

According to at least one disclosed embodiment, implausible or very improbable pose estimations are excluded from the fusing operation on the basis of the a priori information. Although the scaling mainly serves to scale the uncertainty level in accordance with the distance from a comparison trajectory. Depending on the scaling function, the scaling can, however, also be used to remove very improbable pose estimations completely. In this way it can be ensured that implausible pose estimations do not adversely affect the result of the fusing process.

According to at least one disclosed embodiment, an uncertainty estimation is carried out for the pose of the transportation vehicle which is acquired by the fusing operation. The correct order of magnitude of the uncertainty estimation of pose estimations is not only significant for location fusion processes. For example, the uncertainty estimation of the transportation vehicle pose can also be included in the path planning of autonomous transportation vehicles.

A disclosed method or a disclosed device may be used in a transportation vehicle.

For the sake of better understanding of the principles of the disclosed embodiments, a more detailed explanation is given below of exemplary embodiments with reference to the figures. Of course, the disclosure is not restricted to these exemplary embodiments and the described features can also be combined or modified without departing from the scope of protection of the disclosure as it is defined in the appended claims.

Figure 1:
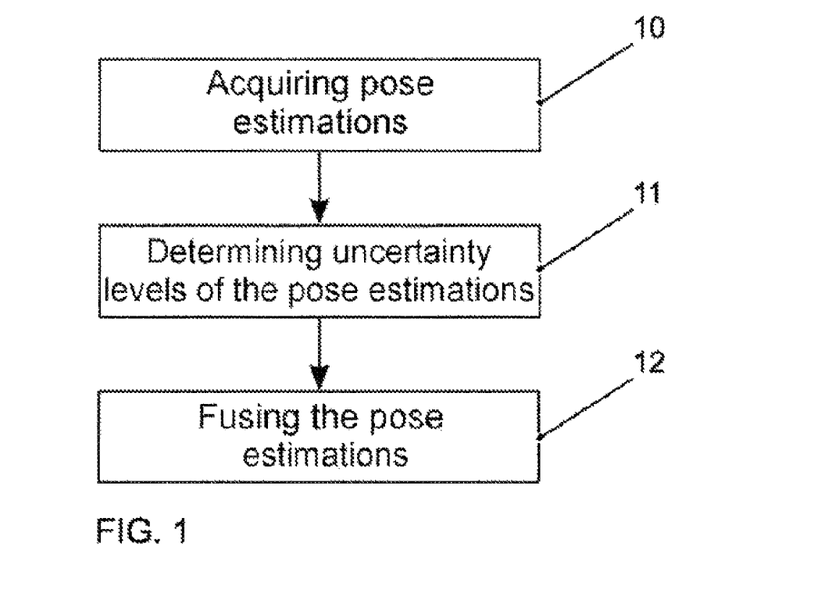
FIG. 1 shows a schematic view of a method for estimating a pose of a transportation vehicle.

FIG. 1 shows a schematic view of a method for estimating a pose of a transportation vehicle. In a first operation, at least one pose estimation is acquired 10. In addition, an uncertainty level of the at least one pose estimation is determined 11. The determination 11 of the uncertainty level of the pose estimation comprises here a process of scaling an uncertainty estimation of the pose estimation on the basis of a comparison of the pose estimation with a priori information. Finally, the at least one pose estimation may be fused 12 with at least one further pose estimation with a weighting corresponding to the uncertainty levels. In this context, an uncertainty estimation can be carried out for the pose of the transportation vehicle which is acquired by the fusing operation 12. The a priori information may be a comparison trajectory, for example, a center of a lane, a reference trajectory of a path planning process or a trajectory of a transportation vehicle traveling ahead. The comparison trajectory can be acquired, e.g., from a detailed map. The uncertainty estimation may be scaled to a greater extent the greater the distance between the associated pose estimation and the comparison trajectory. The scaling process is based here on a symmetrical scaling function or a scaling function which is adapted to the surroundings of a transportation vehicle. In addition, implausible or very improbable pose estimations can be excluded from the fusing operation on the basis of the a priori information.

Figure 2:
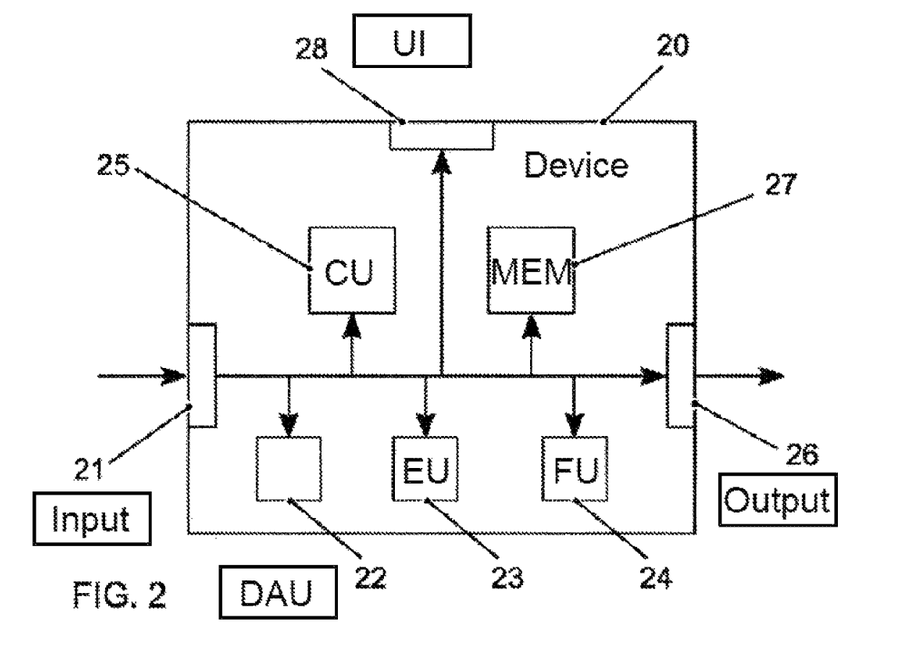
FIG. 2 shows a first embodiment of a device for estimating a pose of a transportation vehicle.

FIG. 2 shows a simplified schematic illustration of a first disclosed embodiment of a device 20 for estimating a pose of a transportation vehicle. The device 20 has an input 21 for receiving data which permits a pose estimation. A data acquisition unit 22 acquires at least one pose estimation. An evaluation unit 23 determines an uncertainty level of the at least one pose estimation. During the determination of the uncertainty level of the pose estimation, the evaluation unit 23 carries out a process of scaling an uncertainty estimation of the pose estimation on the basis of a comparison of the pose estimation with a priori information. The a priori information may be a comparison trajectory, for example, a center of a lane, a reference trajectory of a path planning process or a trajectory of a transportation vehicle traveling ahead. The comparison trajectory can be acquired, e.g., from a detailed map. The uncertainty estimation may be scaled to a greater extent the greater the distance between the associated pose estimation and the comparison trajectory. The scaling process is based here on a symmetrical scaling function or a scaling function which is adapted to the surroundings of a transportation vehicle. In addition, implausible or very improbable pose estimations can be excluded from the fusing operation on the basis of the a priori information. Finally, a fusing unit 24 may fuse the at least one pose estimation with at least one further pose estimation with weighting corresponding to the uncertainty levels. In this context, an uncertainty estimation can be carried out for the pose of the transportation vehicle which is acquired by the fusing operation. The data which is generated by the evaluation unit 23 or the fusing unit 24 are made available automatically or as a reaction to a request via an output 26 of the device 20, for further processing. The data acquisition unit 22, the evaluation unit 23 and the fusing unit 24 can be controlled by a control unit 25. If appropriate, settings of the data acquisition unit 22, the evaluation unit 23, the fusing unit 24 or the control unit 25 can be changed by a user interface 28. The data which occur in the device 20, for example, the data generated by the evaluation unit 23 or the fusing unit 24 can be stored in a memory 27 of the device 20, for example, for later evaluation or for use by the components of the device 20. The data acquisition unit 22, the evaluation unit 23, the fusing unit 24 and the control unit 25 can be implemented as dedicated hardware, for example, as integrated circuits. However, it is, of course, also possible for them to be partially or completely combined or implemented as software which runs on a suitable processor, for example, on a GPU. The input 21 and the output 26 can be implemented as separate interfaces or as a combined bidirectional interface.

Figure 3:
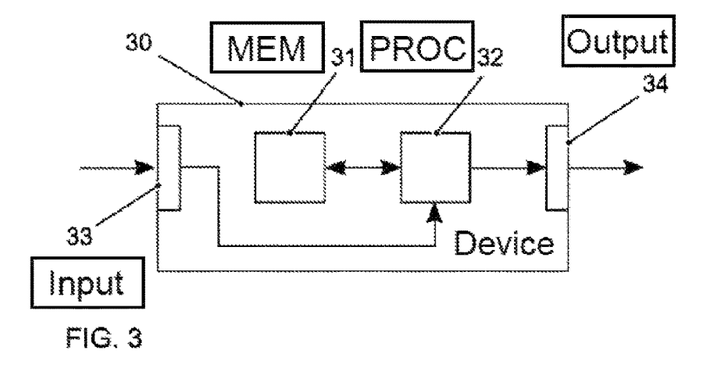
FIG. 3 shows a second embodiment of a device for estimating a pose of a transportation vehicle.

FIG. 3 shows a simplified schematic illustration of a second disclosed embodiment of a device 30 for estimating a pose of a transportation vehicle. The device 30 has a processor 32 and a memory 31. The device 30 is, for example, a computer or a control device. Instructions, which when executed by the processor 32 cause the device 30 to execute the operations according to one of the described methods, are stored in the memory 31. The instructions which are stored in the memory 31 therefore embody a program which can be executed by the processor 32 and which implements the disclosed method. The device has an input 33 for receiving information, for example, data, which has been collected by a sensor system of the transportation vehicle. Data generated by the processor 32 are made available via an output 34. Furthermore, the data can be stored in the memory 31. The input 33 and the output 34 can be combined to form a bidirectional interface.

The processor 32 can comprise one or more processor units, for example, microprocessors, digital signal processors or combinations thereof.

The memories 27, 31 of the described embodiments can have both volatile and non-volatile memory areas and comprise a wide variety of storage units and storage media, for example, hard disks, optical storage media or semiconductor memories.

Figure 4:
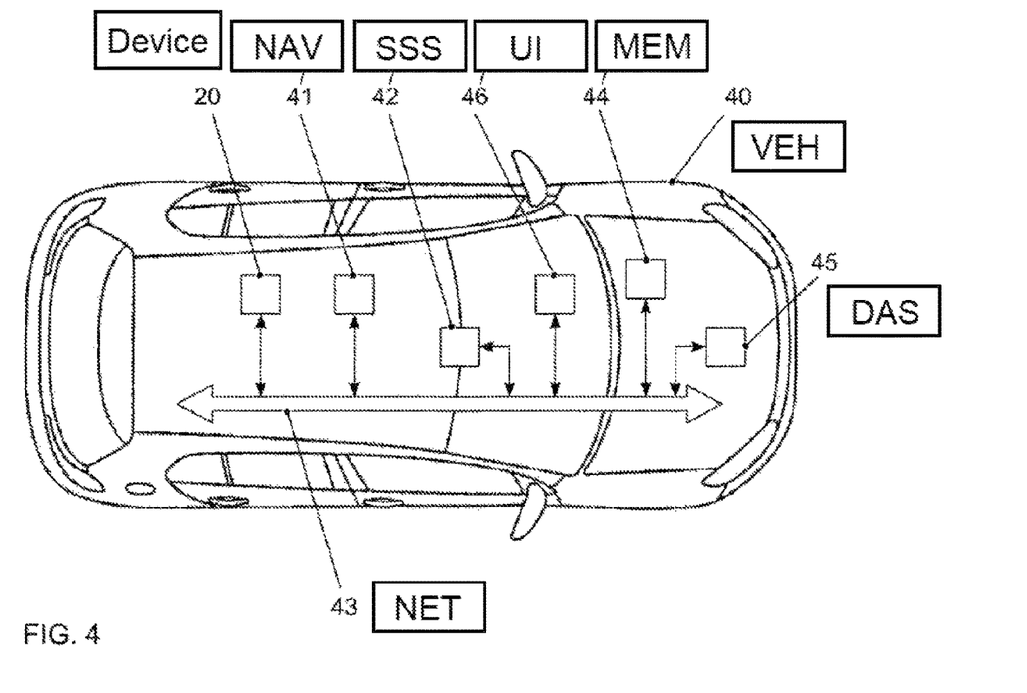
FIG. 4 is a schematic illustration of a transportation vehicle in which a disclosed solution is implemented.

FIG. 4 is a schematic illustration of a transportation vehicle 40 in which a disclosed solution is implemented. The transportation vehicle 40 has, inter alia, a navigation system 41 and an surroundings sensor system 42, for example, a camera system or radar system. The data collected by the navigation system 41 and the surroundings sensor system 42 are transmitted via a network 43 to a device 20 for estimating a pose of the transportation vehicle 40. The data generated by the device 20 can be stored in a memory 44 of the transportation vehicle 40. In addition, the data can be made available to a driver assistance system 45 of the transportation vehicle 40, for example, for a path planning process. Furthermore, the data can be communicated to the driver by a user interface 46, for example, an infotainment system with a display device.

Figure 5:
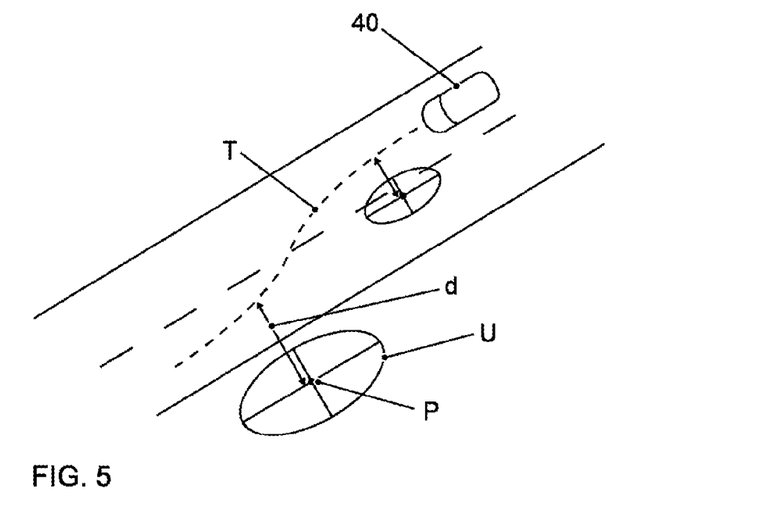
FIG. 5 illustrates the scaling of the uncertainty estimation based on the distance from a comparison trajectory.

A disclosed embodiment is to be explained below with reference to FIGS. 5 to 7, wherein a comparison trajectory is used as a priori information.

For any pose estimations it is to be determined whether the uncertainty level has been estimated too small. The i-th input pose $z_i$ is modeled here as the "true" pose $p_i$ plus a measurement error $\varepsilon_i$, which can be described with a Gauss distribution:

$$z_i = p_i + \varepsilon_i, \; \varepsilon_i \sim \mathcal{N}(0, \Sigma_i) \tag{2}$$

The covariance matrix can be scaled by additional information such as, e.g., a high-precision map of the road geometry, to achieve better modeling of the input data. Apart from location fusing process, the correct order of magnitude of the uncertainty estimation of pose estimations is also significant for other applications. For example, the path planning process of autonomous transportation vehicles can also include the uncertainty estimation of the transportation vehicle pose.

It is to be noted that the method functions independently of the source and the sensor which has performed a pose estimation. The method is not based on the underlying measuring properties of a sensor but rather based only on the estimated pose itself and can therefore be used for basically any pose estimation as long as a number of assumptions which are explained further below are satisfied.

Each pose estimation is processed independently of the other pose estimations. This method is therefore configured for online processing, but can also be carried out offline. The method described here is based essentially on the comparison between a comparison trajectory and a pose estimation. If this pose estimation is far away from the comparison trajectory, the uncertainty level is scaled correspondingly.

This comparison trajectory can originate from a plurality of sources. On the one hand, it can always be obtained from detailed maps as the geometric center line of a road. This can be done both for non-autonomous and for autonomous transportation vehicles. For autonomous transportation vehicles it is alternatively possible for the calculated reference trajectory of the path planning process to serve as a comparison trajectory. In areas in which there are no maps, for autonomous transportation vehicles there are in some cases trajectories of transportation vehicles traveling ahead, so-called scouting transportation vehicles, which the transportation vehicles are intended to follow. These can also serve as comparison trajectories.

To permit the comparison between a pose estimation and the comparison trajectory, the pose estimation must be present in the same coordinate system as the comparison trajectory or must be able to be transformed therein. For the use of the center of the roadway as a comparison trajectory this means that only pose estimations which are also present in this coordinate system can be processed. This excludes, e.g., pose estimations which are valid in the transportation vehicle coordinate system, for example, of an odometry unit. On the other hand, pose estimations composed of GPS data can be used for this, since they are present in the same coordinate system as the map. All the pose estimations which originate from map-relevant localization algorithms can also be used.

The specific representation and parameterization of the comparison trajectory is unimportant here. The trajectory can be provided both by a piecewise linear representation, by n-th degree polynomials, by clothoids etc. It is sufficient that the distance of a pose estimation from this comparison trajectory can be determined.

A basic concept of the disclosure consists in scaling the uncertainty estimation of the associated pose estimation by this distance. FIG. 5 illustrates the objective of this procedure on the basis of a comparison trajectory T which specifies a change of traffic lane. Absolute position estimations P with associated uncertainty level U with a different distance d from the comparison trajectory T of a transportation vehicle 40 are illustrated. The covariance matrix which describes the uncertainty level of the measurement is scaled in proportion with the distance from the comparison trajectory. Pose estimations with a large distance from the comparison trajectory are less probable per se, which is expressed by a relatively high uncertainty estimation as the covariance matrix.

The disclosed embodiment illustrated below is limited to a two-dimensional coordinate system. Poses in the plane (2D) are assumed for this. These are described as positions in x, y and heading $\Psi$: $p_i=[x, y, \Psi]^T$. However, the method can also be applied directly if only the position is considered without a heading or if all six degrees of freedom are considered for the pose estimation.

It is assumed below that for the i-th pose estimation $p_i$ the distance from the comparison trajectory (in the transportation vehicle coordinate system) has been determined in the longitudinal direction (positive in the direction of travel) $\delta_x$, in the lateral direction (positive to the left) $\delta_y$ and in the heading (positive rotation to the left) $\delta_\Psi$. The precise method for this is not significant here. It is possible, for example, to use simple means to make an assignment to the corresponding point of the comparison trajectory and subsequently calculate the distance.

An alternative disclosed embodiment consists in the fact that the center of the lane is intended to serve as a comparison trajectory. This case is appropriate, for example, within the framework of non-autonomous transportation vehicles, since the drivers orient themselves relative to the center of the lane. With a camera system it is then possible to capture the lane boundaries to the left and to the right and therefore calculate the distance of the transportation vehicle from the center of the lane. This additional information helps to detect situations in which the transportation vehicle is not located close to the center of the lane. The distance of the pose estimation from the center of the lane can therefore be replaced by the distance from the center of the lane plus the distance which the camera system has calculated relative to the center of the lane.

The object is then to develop scaling for the covariance matrix. A scaling matrix S which is based on functions $s_x(\delta_x)$, $s_y(\delta_y)$ and $s_\Psi(\delta_\Psi)$ is developed for this. To describe the problem in a generally valid way, S is represented as a matrix. S is given as $$S = \begin{bmatrix} s_x(\delta_x) & 0 & 0 \\ 0 & s_y(\delta_y) & 0 \\ 0 & 0 & s_\Psi(\delta_\Psi) \end{bmatrix} = L_S L_S^T, \quad (3)$$

where the matrix $L_S$ is the Cholesky decomposition of S. For a diagonal matrix the Cholesky decomposition is very simple, since simply the route can be taken from the diagonal entries. The scaling of the weighting matrix $\Omega_i$ occurs as $$\overline{\Omega}_i = L_S \Omega_i L_S^T. \quad (4)$$

This indicates how scaling is to be applied. Then, it is also necessary to determine how such a scaling function should be specifically produced for the weighting matrix. The starting point for this is a function $s_k(\delta_k)$ where $k \text{ Å} \{x, y, \Psi\}$. It should satisfy the following conditions:

1. $s_k(\delta_k) > 0$: The scaling function must be positive over the entire value range to ensure the positive definite quadratic form of the covariance matrices.
2. $s_k(\delta_k) = s_k(-\delta_k)$: The scaling function is to be symmetrical, since the direction of the deviation from the comparison trajectory should as a rule not influence the magnitude of the scaling.
3. $s_k(\delta_{k,1}) \leq s_k(\delta_{k,2})$ for $|\delta_{k,1}| \leq |\delta_{k,2}|$: It should always be the case that a measurement which is further distant from the comparison trajectory is at maximum scaled to the same extent as a measurement which is close to the comparison trajectory.

Figure 6:
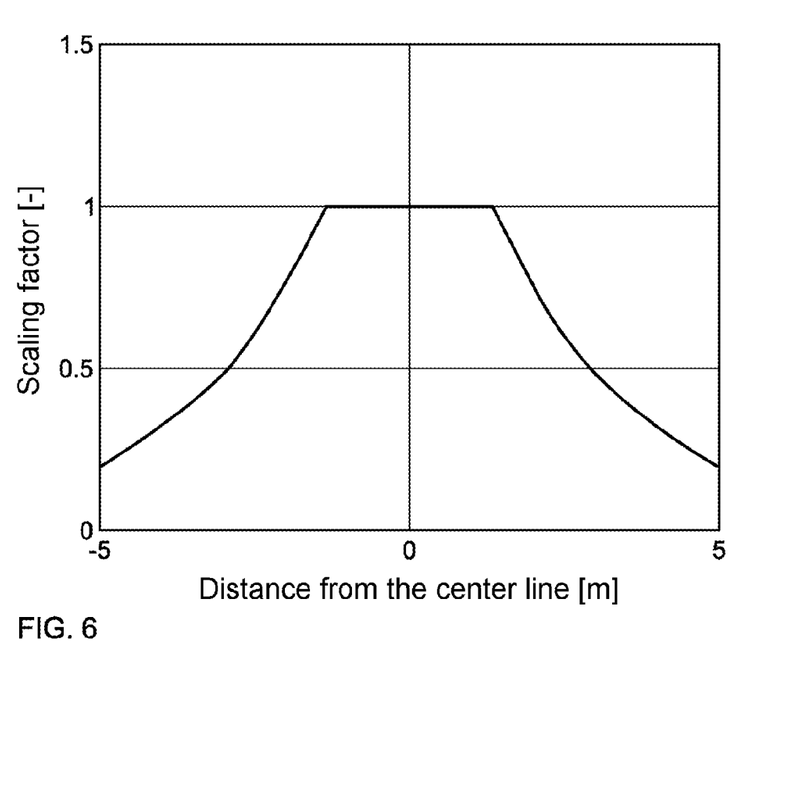
FIG. 6 illustrates a first possible scaling function.
Figure 7:
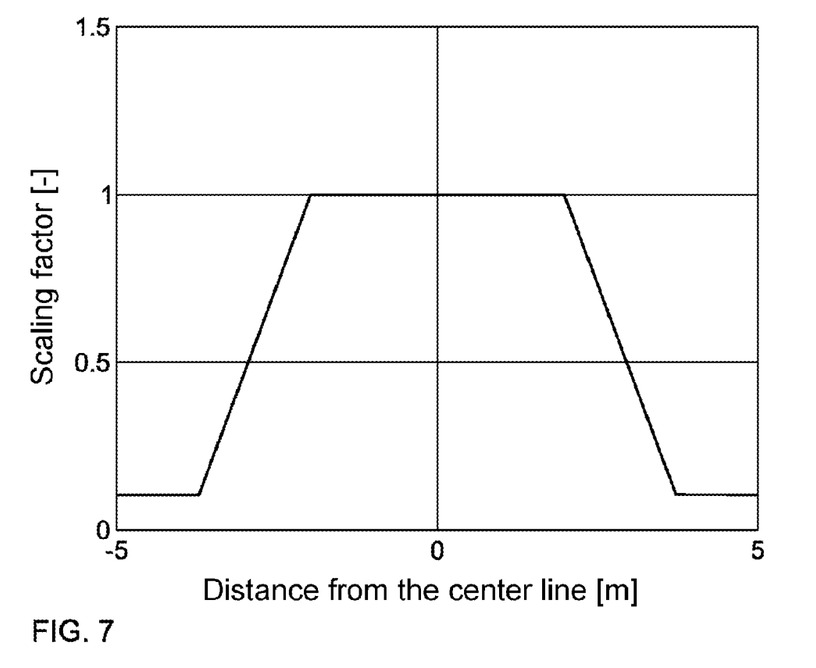
FIG. 7 illustrates a second possible scaling function.

FIG. 6 and FIG. 7 show two exemplary functions for the scaling of the weighting matrix which satisfy the above-mentioned conditions.

It is to be noted here that the abovementioned conditions are not a precondition for using the method. Other scaling functions which partly contradict these conditions are also possible. Therefore, for example, further map information can also be input into the scaling function. The following situation can be imagined for this: A transportation vehicle traveling along a road on which there is a building on one side and a parking lot on the other. Instead of assuming that the scaling function is symmetrical, a form of the function which is adapted to the situation is used. Noisy measurements which indicate the position of the transportation vehicle in the building are no longer taken into account in the optimization problem. On the other hand, if a measurement indicates the position of the transportation vehicle in the parking lot, this measurement is taken into account to a smaller extent, but it is not as erroneous as a measurement of the position in the building. A comparable situation is, e.g., traveling over a bridge. A pose estimation which is beyond the road which can be traveled on is to be evaluated as absolutely implausible in this situation.

LIST OF REFERENCE SYMBOLS

10 Acquiring pose estimations
11 Determining uncertainty levels of the pose estimations
12 Fusing the pose estimations
20 Device
21 Input 22 Data acquisition unit
23 Evaluation unit
24 Fusing unit
25 Control unit
26 Output
27 Memory
28 User interface
30 Device
31 Memory
32 Processor
33 Input
34 Output
40 Transportation vehicle
41 Navigation system
42 Surroundings sensor system
43 Network
44 Memory
45 Driver assistance system
46 User interface
P Position estimation
U Uncertainty level
T Comparison trajectory
d Distance from comparison trajectory

The invention claimed is:

1. A method for estimating a pose of a transportation vehicle, comprising:
   acquiring at least one pose estimation including an estimate of a position of the transportation vehicle and an estimate of an orientation of the transportation vehicle; and
   determining an uncertainty level of the at least one pose estimation;
   wherein the determination of the uncertainty level of the pose estimation comprises a process of scaling an uncertainty estimation of the pose estimation based on a comparison of the pose estimation with a priori information,
   wherein the a priori information is a comparison trajectory, and
   wherein the scaling of the uncertainty estimation increases as a value of a lateral distance between the estimate of the position of the transportation vehicle of the associated pose estimation and the comparison trajectory increases.

2. The method of claim 1, wherein the comparison trajectory is a center of a lane, a reference trajectory of a path planning process or a trajectory of a transportation vehicle traveling ahead.

3. The method of claim 1, wherein the comparison trajectory is acquired from a detailed map.

4. The method of claim 1, wherein a distance of the transportation vehicle from the comparison trajectory is acquired with a camera system.

5. The method of claim 1, wherein the scaling process is based on a symmetrical scaling function or a scaling function which is adapted to the surroundings of a transportation vehicle.

6. The method of claim 1, wherein the at least one pose estimation is fused with at least one further pose estimation with a weighting corresponding to the uncertainty levels.

7. The method of claim 6, wherein implausible or very improbable pose estimations are excluded from the fusing operation based on the a priori information.

8. The method of claim 6, wherein an uncertainty estimation is carried out for the pose of the transportation vehicle which is acquired by the fusing operation.

9. A non-transitory computer-readable storage medium with instructions which, when executed by a computer, cause the computer to execute for estimating a pose of a transportation vehicle, the method comprising:
   acquiring at least one pose estimation including an estimate of a position of the transportation vehicle and an estimate of an orientation of the transportation vehicle; and
   determining an uncertainty level of the at least one pose estimation; wherein the determination of the uncertainty level of the pose estimation comprises a process of scaling an uncertainty estimation of the pose estimation based on comparison of the pose estimation with a priori information,
   wherein the a priori information is a comparison trajectory, and
   wherein the scaling of the uncertainty estimation increases as a value of a lateral distance between the estimate of the position of the transportation vehicle of the associated pose estimation and the comparison trajectory increases.

10. A device for estimating a pose of a transportation vehicle, comprising:
    a data acquisition unit for acquiring at least one pose estimation including an estimate of a position of the transportation vehicle and an estimate of an orientation of the transportation vehicle; and
    an evaluation unit for determining uncertainty level of the at least one pose estimation;
    wherein the evaluation unit carries out a process of scaling an uncertainty estimation of the pose estimation based on a comparison of the pose estimation with a priori information in response to the uncertainty level of the pose estimation being determined,
    wherein the a priori information is a comparison trajectory, and
    wherein the scaling of the uncertainty estimation increases as a value of a lateral distance between the estimate of the position of the transportation vehicle of the associated pose estimation and the comparison trajectory increases.

11. The device of claim 10, further comprising a fusing unit for fusing the at least one pose estimation with at least one further pose estimation with a weighting corresponding to the uncertainty levels.

12. A transportation vehicle, comprising the device for estimating a pose of the transportation vehicle of claim 10.

* * * * *